United States Patent
Chen et al.

(10) Patent No.: US 10,785,060 B2
(45) Date of Patent: *Sep. 22, 2020

(54) EFFICIENT CHANNEL ESTIMATION AND SYMBOL DETECTION FOR MASSIVE MIMO-OFDM

(71) Applicants: Biao Chen, Jamesville, NY (US); Michael Gans, Rome, NY (US); John Matyjas, Rome, NY (US)

(72) Inventors: Biao Chen, Jamesville, NY (US); Michael Gans, Rome, NY (US); John Matyjas, Rome, NY (US)

(73) Assignee: SYRACUSE UNIVERSITY, Syracuse, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/537,750

(22) Filed: Aug. 12, 2019

(65) Prior Publication Data

US 2019/0363909 A1    Nov. 28, 2019

Related U.S. Application Data

(63) Continuation of application No. 15/767,495, filed as application No. PCT/US2016/056581 on Oct. 12, 2016, now Pat. No. 10,411,913.

(60) Provisional application No. 62/240,006, filed on Oct. 12, 2015.

(51) Int. Cl.
| | |
|---|---|
| *H04L 25/02* | (2006.01) |
| *H04L 27/26* | (2006.01) |
| *H04B 7/0413* | (2017.01) |
| *H04L 5/00* | (2006.01) |

(52) U.S. Cl.
CPC ....... *H04L 25/0204* (2013.01); *H04B 7/0413* (2013.01); *H04L 5/001* (2013.01); *H04L 25/022* (2013.01); *H04L 25/023* (2013.01); *H04L 25/025* (2013.01); *H04L 25/0224* (2013.01); *H04L 27/2647* (2013.01)

(58) Field of Classification Search
CPC . H04B 7/0413; H04L 25/0204; H04L 25/022; H04L 25/0224; H04L 25/023; H04L 25/025; H04L 27/2647; H04L 5/001
See application file for complete search history.

(56) References Cited

U.S. PATENT DOCUMENTS

| | | | |
|---|---|---|---|
| 2008/0192857 A1* | 8/2008 | Miyoshi | H04L 27/2647 375/285 |
| 2009/0028106 A1* | 1/2009 | Hansen | H04L 27/2613 370/329 |
| 2013/0070741 A1* | 3/2013 | Li | H04W 72/046 370/338 |
| 2015/0333933 A1* | 11/2015 | Lopez de Victoria | H04L 25/0224 375/343 |

* cited by examiner

*Primary Examiner* — David S Huang
(74) *Attorney, Agent, or Firm* — Bond Schoeneck and King PLLC; David Nocilly; George McGuire

(57) ABSTRACT

A communication system that minimizes the transmission of pilot symbols while ensuring real-time channel tracking and symbol detection. The system employs a multiple-input multiple-output (MIMO) transmitter-receiver pair where there are many more receive antennas than transmit antennas. Communication occurs over a wide band RF channel via orthogonal frequency division multiplexing (OFDM) that employs a large number of sub-carriers.

17 Claims, 3 Drawing Sheets

EFFICIENT CHANNEL ESTIMATION AND SYMBOL DETECTION FOR MASSIVE MIMO-OFDM

CROSS-REFERENCE TO RELATED APPLICATIONS

This application is a continuation of U.S. application Ser. No. 15/767,495, filed on Apr. 11, 2018, which was a national stage application of PCT Application No. PCT/US16/56581, filed on Oct. 12, 2016, which claimed priority to U.S. Provisional No. 62/240,006, filed on Oct. 12, 2015.

BACKGROUND OF THE INVENTION

1. Field of the Invention

The present invention relates to communication systems and, more particularly, to a broadband multiple-input multiple-output (MIMO) that significantly simplifies receiver processing while avoiding or minimizing the need for pilot symbols.

2. Description of the Related Art

Multiple-input multiple-output orthogonal frequency division multiplexing (MIMO-OFDM) is the primary air interface for broadband wireless communications, such as 4G and 5G cellular communications. For MIMO-OFDM systems, the uplink transmissions typically have asymmetric antenna numbers: the number of transmit antennas is rather limited while the number of receive antennas can be quite large, especially in the envisioned massive MIMO systems. For coherent signal reception, pilot symbols are typically necessary for channel estimation and requires complicated processing of the received signals in either the time domain or the frequency domain. Accordingly there is a need in the art for a system that avoids or minimizes the need for pilot symbols. Additionally, with massive receive arrays, channel estimation and symbol detection can be computationally challenging thus it is desirable to develop receiver processing that is much less complex than the existing art.

BRIEF SUMMARY OF THE INVENTION

The invention is a system for communicating from a multiple antenna transmitter to a receiver that employs a large number of antennas that reduces or completely avoids the need for conventional "pilot symbols" that must otherwise be used for effective channel tracking. The system may be used to improve broadband wireless communications, satellite to ground communications, and air to ground communications. In air-to-ground wideband communications, a massive and large aperture antenna array is deployed at the receiver whereas the number of transmit antennas is limited due to the space limitation for airborne platforms. Similar situation arises in uplink transmission for the cellular systems where a base station (receiver) is typically equipped with much more antennas than that of the mobile station (transmitter). With sufficiently large computational power, channel estimation and symbol detection can be carried out without the need for sending pilot symbols. With limited computation power, an efficient channel estimation and symbol detection scheme may be used that requires the concurrent transmission of only a single OFDM training symbol. The key to the present invention is the asymmetry in antenna arrays and the large number of sub-carriers in the OFDM system for the envisioned application.

A wireless communication system according to the present invention includes a transmitter having multiple transmit antennas programmed to transmit independent data streams using a plurality of sub-carriers, wherein each data stream includes a data frame having a training orthogonal frequency division multiplexing (OFDM) block and a plurality of payload OFDM blocks, and a receiver having multiple receive antennas programmed to receive the independent data streams, to perform a channel estimation using the training OFDM block, and to use the channel estimation to detect the next payload OFDM block in the plurality of payload OFDM blocks. The receiver is programmed to perform the channel estimation using asymptotic orthogonality of a data symbol matrix given that the number of sub-carriers is typically large. The receiver is programmed to perform the channel estimation by aggregating the training OFDM blocks from all transmit antennas and all sub-carriers. The receiver is also programmed to perform the channel estimation by constructing a matrix using the aggregated training OFDM blocks. The training OFDM blocks may comprise previously detected payload OFDM blocks. The receiver is programmed to detect a training OFDM block or a payload OFDM block using data received at a predetermined sub-carrier from all receive antennas, to construct a frequency response vector, to construct a multiple-input multiple-output (MIMO) matrix corresponding to the predetermined sub-carrier for all vectors, to calculate the least square estimate in lieu of matrix inversion, and to map the least square estimate to a constellation set using the minimum distance criterion. Receiver is programmed to perform a down-conversion and sample the independent data streams. Only a single training OFDM block may be used, thereby avoiding the need for recurrent pilot symbols.

A method of communicating data in a multiple-input multiple-output orthogonal frequency division multiplexing wireless communication system according to the present invention begins with transmitting independent data streams using a plurality of sub-carriers from a transmitter having multiple transmit antennas, wherein each data stream includes a data frame having a training orthogonal frequency division multiplexing (OFDM) block and a plurality of payload OFDM blocks. Next, the independent data streams are received with a receiver having multiple receive antennas programmed to receive. Channel estimation is then performed using the training OFDM bloc. Finally, the channel estimation is used to detect the next payload OFDM block in the plurality of payload OFDM blocks. The step of performing the channel estimation comprises using asymptotic orthogonality of a data symbol matrix based on the number of sub-carriers. The step of performing the channel estimation may comprise aggregating the training OFDM blocks from all transmit antennas and all sub-carriers. The step of performing the channel estimation may further comprise constructing a matrix using the aggregated training OFDM blocks. The training OFDM blocks may be previously detected payload OFDM blocks. The method may further comprise the steps of detecting a training OFDM block or a payload OFDM block using data received at a predetermined sub-carrier from all receive antennas, constructing a frequency response vector, constructing a multiple-input multiple-output (MIMO) matrix corresponding to the predetermined sub-carrier for all vectors, calculating the least square estimate in lieu of matrix inversion, and mapping the least square estimate to a constellation set using the minimum distance criterion.

BRIEF DESCRIPTION OF THE SEVERAL VIEWS OF THE DRAWING(S)

The present invention will be more fully understood and appreciated by reading the following Detailed Description in conjunction with the accompanying drawings, in which.

DETAILED DESCRIPTION OF THE INVENTION

Figure 1:
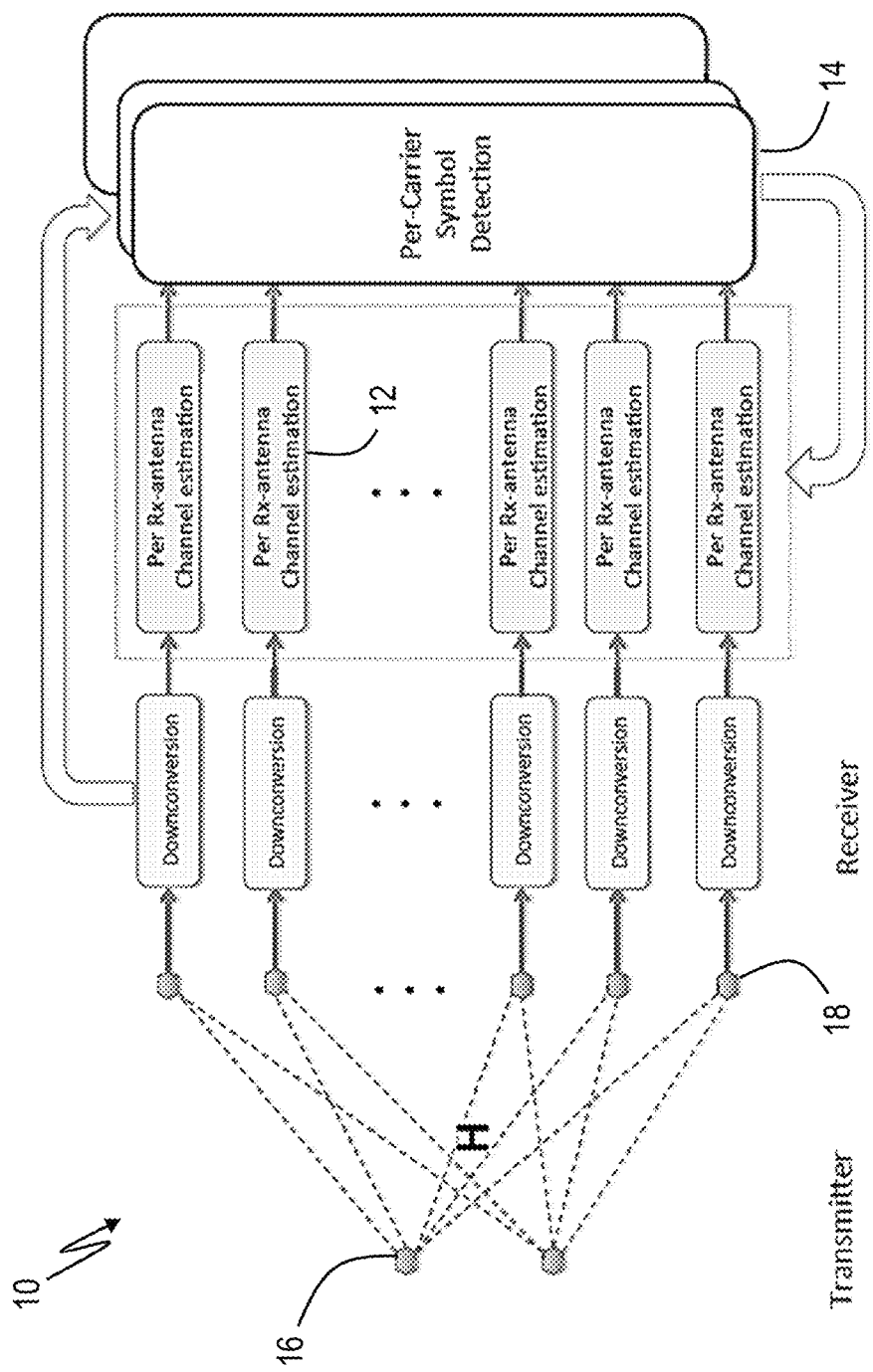
FIG. 1 is a diagram of a system according to the present invention.

Referring now to the drawings, wherein like reference numerals refer to like parts throughout, there is seen in FIG. 1 a multiple-input multiple-output (MIMO)-orthogonal frequency-division multiplexing (OFDM) system 10 according to the present invention where channel estimation 12 is done in the temporal domain for each antenna pair while symbol detection 14 is done on a per-sub-carrier basis. The system minimizes the transmission of pilot symbols while ensuring the real-time channel tracking and symbol detection can be achieved.

Specifically, system 10 encompasses a transmitter 16 that employs I transmit antennas and a receiver 18 that employs J receive antennas. J is much great than I, i.e., there are many more receive antennas than transmit antennas. Communication occurs over a wide band RF channel. Orthogonal frequency division multiplexing (OFDM) is chosen as it is the de facto scheme for current and future broadband wireless systems. An OFDM system employs N sub-carriers and cyclic prefix (CP) of length P, measured in units of symbol interval. The parameter is chosen such that N is much greater than P and the CP length is larger than the channel delay spread denoted by L.

In a system according to the present invention, transmitter 16 sends independent data streams from each of the transmit antennas. Each data frame encompasses a training OFDM block which is used for synchronization at the receiver as well as for channel estimation of the transmission channels. This block is followed by a long stream of payload OFDM blocks that carry the actual data. As seen in FIG. 1, incoming data at receiver 18 goes through standard down-conversion at each receive antenna, sampling, synchronization, CP removal, and then inverse discrete Fourier transform (IDFT) to convert the time-domain input symbols into frequency domain signals. The frequency domain signals are then processed together for channel estimation using the known symbols, and the channel estimate is then used for joint symbol detection across receive antennas on a per-carrier basis.

Figure 2:
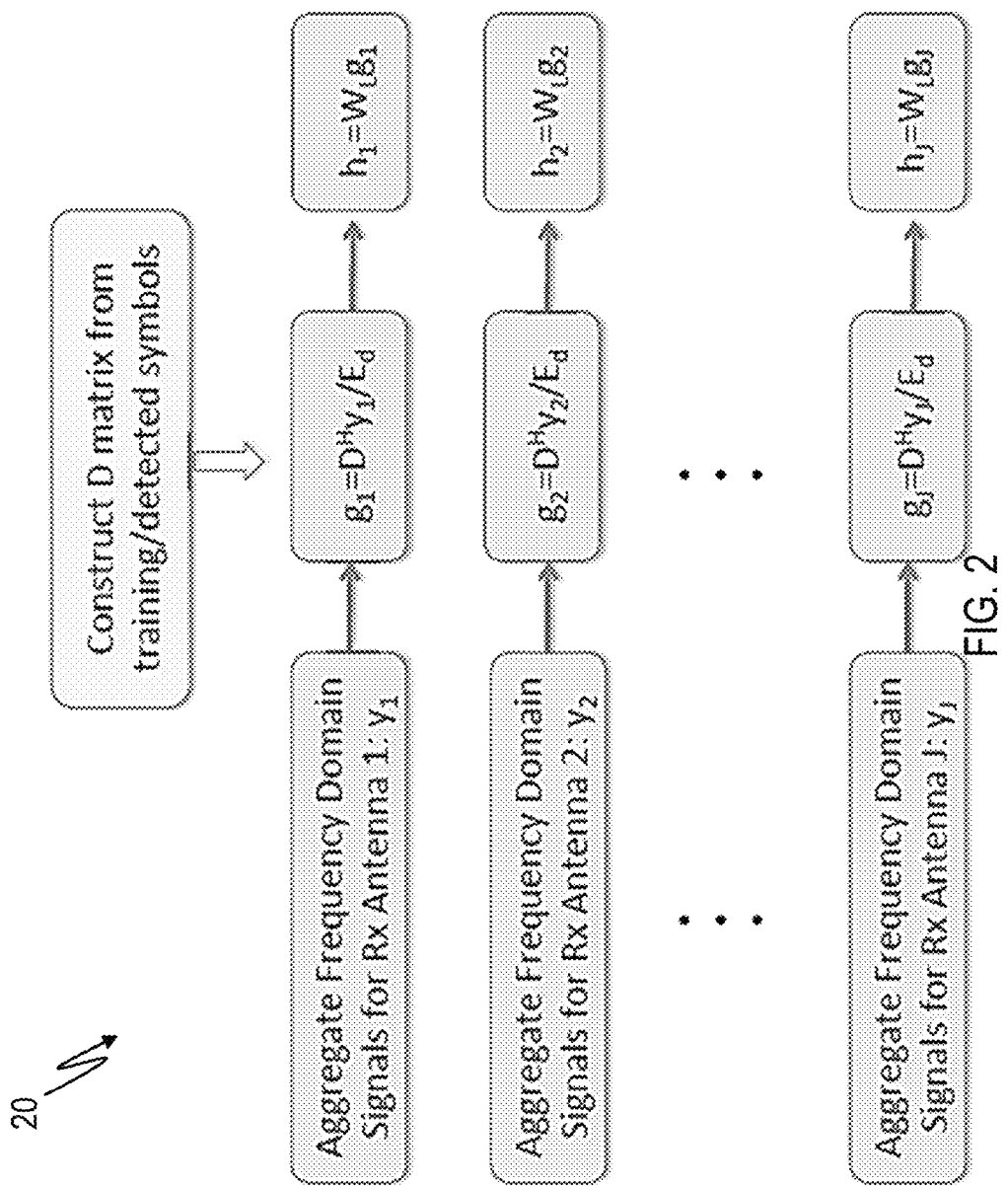
FIG. 2 is a diagram of a channel estimation block according to the present invention.

Next, the receiver uses the training OFDM block for estimation. The channel estimation block uses the asymptotic orthogonality of a data symbol matrix with large N (the number of sub-carriers). This significantly speeds up the implementation over conventional systems. As seen in FIG. 2, symbols are pre-arranged to form a large matrix 20 whose columns are asymptotically orthogonal due to the fact that a large number of subcarriers is employed. This enables reduced complexity channel estimation. For example, the system aggregate symbols from all transmit antennas for all sub-carriers. These symbols can be the training symbols in the initial block or the detected symbols in subsequent payload blocks. The frequency domain symbols emitted at the ith transmit antenna are denoted by $d_i(1), \ldots, d_i(N)$ that correspond to the N sub-carriers. An N×IL matrix is then constructed using training or detected symbols according to equation (5) below, i.e., a diagonal matrix $D_i$ is constructed using the transmit symbols at the ith antenna, for each $D_i$, $W_L$ is post-multiplied and the products stacked column wide as in equation (5):

$$D = [D_1 W_L | D_2 W_L | \ldots | D_I W_L] \quad (5)$$

$$g_j = \begin{bmatrix} g_{1j} \\ g_{2j} \\ \vdots \\ g_{Ij} \end{bmatrix}$$

Last, reduced complexity channel estimation is performed. If one assumes that the frequency symbols for the ith antenna $d_i$ is independent and identically distributed from a finite alphabet D with zero mean, and that $d_i$ and $d_k$ are independent of each other for $i \neq k$. As N becomes large, the columns in the D matrix defined in equation (5) are asymptotically orthogonal to each other. Thus, given the assumption that N is large, column wise orthogonality of the matrix is established for D. Thus, to estimate $g_j$ (the channel vectors corresponding to the jth receive antenna), one can simply pre-multiply $y_j$ with $D^H$ instead of the usual LS solution that involves matrix inversion and can be extremely time consuming for high dimension matrices.

Figure 3:
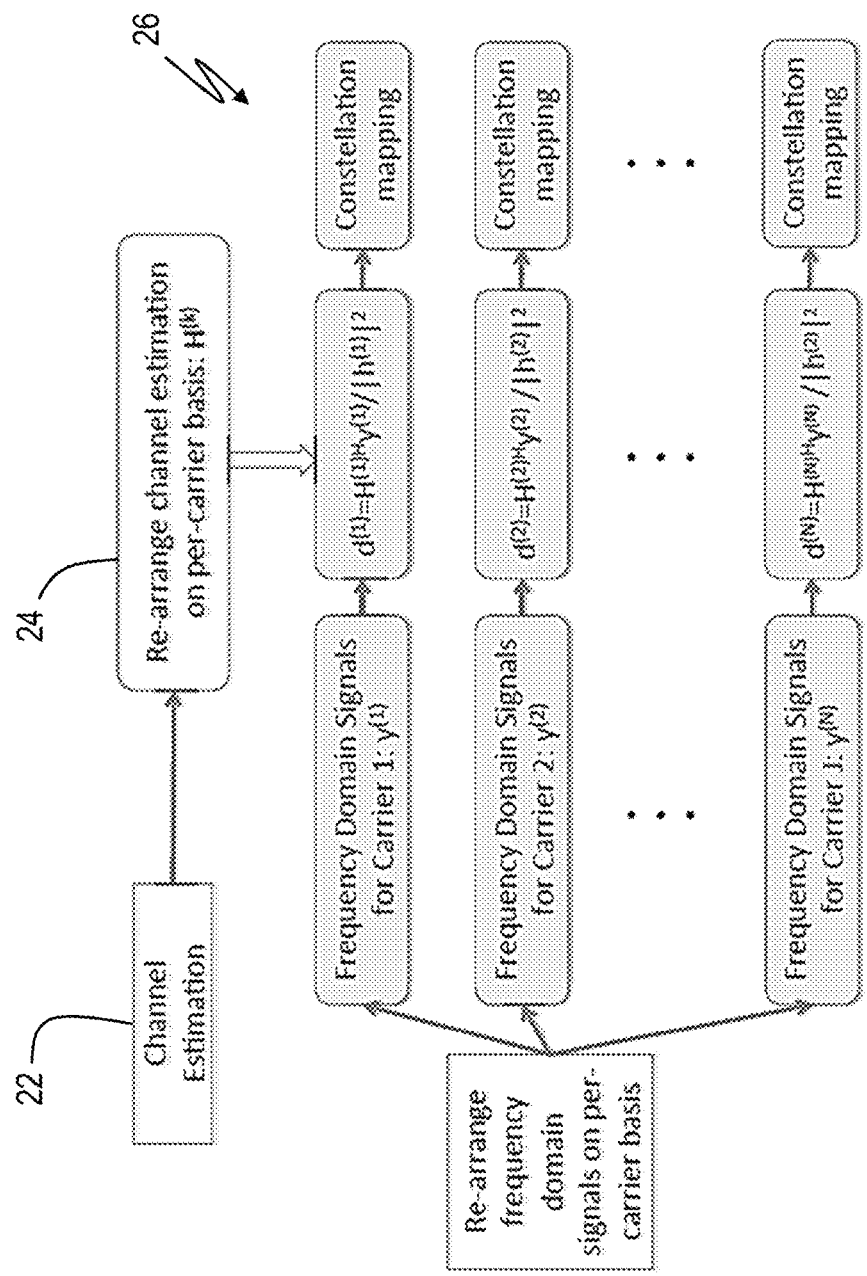
FIG. 3 is a diagram of a symbol detection block according to the present invention.

Next, the receiver uses the estimated channel for symbol detection for the next payload OFDM block. The symbol detection uses the asymptotic column wise orthogonality in its channel matrix for each sub-carrier. This again ensures a much faster implementation over conventional MIMO-OFDM symbol detection. As seen in FIG. 3, the estimated channel 22 in the temporal domain is converted to frequency domain 24 to obtain a per-carrier MIMO channel matrix 26 whose columns are orthogonal due to the fact that a large number of receive antennas is employed. This approach enables reduced complexity symbol detection. In this step, for each k, k=1, ... N, the received data is collected at the kth sub-carrier from all receive antennas and the vector $y^{(k)}$ is constructed according to equation (7) below:

$$y^{(k)} = \begin{bmatrix} y_1(k) \\ y_2(k) \\ \vdots \\ y_J(k) \end{bmatrix}$$

From the estimated channel vector $g_{ij}$, for i=1, ..., I, j=1, ..., J, the frequency response vector is constructed by $h_{ij}=W_L g_{ij}$. Then, the MIMO matrix $H^{(k)}$ corresponding to the kth sub-carrier from all $h_{ij}$ vectors is constructed from equation (8):

$$H^{(k)} = \begin{bmatrix} h_{11}(k) & h_{21}(k) & \ldots & h_{I1}(k) \\ h_{12}(k) & h_{22}(k) & \ldots & h_{I2}(k) \\ \vdots & \vdots & \ddots & \vdots \\ h_{1J}(k) & h_{2J}(k) & \ldots & h_{IJ}(k) \end{bmatrix},$$

-continued $$d^{(k)} = \begin{bmatrix} d_1(k) \\ d_2(k) \\ \vdots \\ d_I(k) \end{bmatrix}, z^{(k)} = \begin{bmatrix} z_1(k) \\ z_2(k) \\ \vdots \\ z_J(k) \end{bmatrix}.$$

If $g_{ij}$ consists of independent entries each with zero mean and $g_{ij}$ and $g_{i'j'}$ are pairwise independent for $(i,j) \neq (i',j')$, then all the columns of the matrix $H^{(k)}$ defined in equation (8) have asymptotically orthogonal columns as J approaches m. Since the columns of $H^{(k)}$ are orthogonal, pre-multiplying $y^{(k)}$ will give the LS estimate of $d^{(k)}$ in lieu of matrix inversion. The estimated $d^{(k)}$ may then be mapped to the constellation set using the minimum distance criterion.

Lastly, the receiver refines channel estimation using the currently detected OFDM block and continues on to the next OFDM payload block.

Following are the assumptions and calculations that underlie the approach of the present invention:

A transmitter is equipped with I antennas while the receiver be equipped with J antennas. In addition, the transmission channel has a bandwidth that is considered a wide band channel, or, equivalently in the temporal domain, the delay spread is much greater than the inverse of the bandwidth. OFDM is thus chosen and a large number of sub-carriers is assumed in order for each sub-carrier to be approximately 'flat' (i.e., can be modeled as narrowband). N denotes the total number of sub-carriers and P is the corresponding prefix length; N and P are chosen such that N>>P to ensure high spectrum efficiency.

The following assumptions are made with respect to the complex baseband signal/channel model of the present invention:

(i) The channel between the ith transmit antenna and the jth receiver has an impulse response $g_{ij}$ with a channel length L such that L<P. All transceiver antenna pairs are assumed to have equal length which is reasonable as one can append 0 to those channels whose length is shorter. The assumption L<P ensures no inter-symbol interference is incurred. Furthermore, $g_{ij}$ are independent across the antennas, as guaranteed by the antenna spacing at the receiver.

(ii) Noises at each receiver antenna are assumed to be complex Gaussian and independent of each other and of the fading channels.

(iii) We assume J>>I, i.e., the number of receive antennas is much larger than that of the transmit antennas.

(iv) The communication uses full spatial multiplexing: transmitter sends independent data streams across different transmit antennas.

As usual, the ith transmit antenna uses IDFT (inverse discrete Fourier transform) in converting frequency domain symbols (e.g., QAM modulated symbols) $d_i(k)$ into time domain OFDM symbols $s_i(n)$:

$$s_i(n) = \frac{1}{\sqrt{N}} \sum_{k=0}^{N-1} d_i(k) e^{j2\pi kn/N} \text{ for } n = -P, \ldots, -1, 0, \ldots, N-1$$

where $d_{-k} = d_{N-k}$ and the negative subscript is used to denote the CP in a compact manner.

At the jth receive antenna, it receives channel output of the signals transmitted from all the transmit antennas. With the assumption that P≥L, all the sub-carriers effectively experience frequency flat fading channels and there is no inter-symbol interference, thus the received signal can be expressed as:

$$x_j(n) = \sum_{i=1}^{I} \frac{1}{\sqrt{N}} \sum_{k=0}^{N-1} H_{ij}(k) d_i(k) e^{j2\pi kn/N} + v_j(n) \quad (1)$$

for n=0, ..., N−1, i.e., the CP part that is subject to ISI has been removed. Here, $v_j(n)$ is the channel noise at the jth antenna, and $H_{ij}(k)$ is the frequency response at the kth subcarrier corresponding to the channel $g_{ij}$, thus:

$$h_{ij} \triangleq \begin{bmatrix} H_{ij}(0) \\ H_{ij}(1) \\ \vdots \\ H_{ij}(N-1) \end{bmatrix} = W_L g_{ij}$$

where $W_L$ is the first L columns of the DFT matrix W whose entry at kth row and nth column is:

$$\frac{1}{\sqrt{N}} e^{-j2\pi kn/N}$$

for K, n=0, ..., N−1, i.e., $$W = \frac{1}{\sqrt{N}} \begin{bmatrix} 1 & 1 & \ldots & 1 \\ 1 & e^{-j2\pi/N} & \ldots & e^{-j2\pi(N-1)/N} \\ \vdots & \vdots & \ddots & \vdots \\ 1 & e^{-j2\pi(N-1)/N} & \ldots & e^{-j2\pi(N-1)^2/N} \end{bmatrix}$$

Essentially, $W_L g_{ij}$ converts the time domain channel impulse response into frequency responses for the N sub-carriers.

By stacking $x_j(n)$, n=0, ..., N−1 in a vector form, it is possible to verify that:

$$x_j \triangleq \begin{bmatrix} x_j(0) \\ x_j(1) \\ \vdots \\ x_j(N-1) \end{bmatrix} = \sum_{i=1}^{I} W^H D_i W_L g_{ij} + v_j \quad (2)$$

Where $$D_i = \begin{bmatrix} d_i(0) & 0 & \ldots & 0 \\ 0 & d_i(1) & \ldots & 0 \\ \vdots & \vdots & \ddots & \vdots \\ 0 & 0 & \ldots & d_i(N-1) \end{bmatrix}$$

i.e., a diagonal matrix whose diagonal elements consist of frequency domain symbols corresponding to the ith transmit antenna;

$$v_j = \begin{bmatrix} v_j(0) \\ v_j(1) \\ \vdots \\ v_j(N-1) \end{bmatrix}$$

is the noise vector for the jth receive antenna for the corresponding OFDM symbol, and is assumed to be complex Gaussian with zero mean and covariance matrix $N_0 I$, i.e., $v \sim CN(0, N_0 I)$.

The time domain signal model of equation (2) is obtained by noting that the signal component in the time domain is the sum across i, where each of the entries in the sum is the IDFT of the vector with element $H_{ij}(k)d_i(k)$ (c.f. equation (1)). This is also the direct consequence of the fact that the circular convolution in discrete time domain corresponds to multiplication in discrete frequency domain (as defined via DFT).

As with a conventional OFDM receiver, upon removing CP, the receiver implements DFT to obtain frequency domain observations for the jth receive antenna:

$$y_j = \begin{bmatrix} y_j(0) \\ y_j(1) \\ \vdots \\ y_j(N-1) \end{bmatrix} = W x_j = \sum_{i=1}^{I} D_i W_L g_{ij} + z_j \quad (3)$$

where $WW^H = I$ as W is a unitary matrix and $z_j = Wv$ which has the same statistics as v due again to the fact that W is a unitary matrix. Thus $z \sim CN(0, N_0 I)$.

Given the OFDM received signal vector (either the time domain vector $x_j$ or the frequency domain vector $y_j$, j=1, . . . J), it is necessary to Estimate the transmission channel either in time domain $g_{ij}$ or in frequency domain $h_a = W_L g_{ij}$ and detect the frequency domain symbols $d_i$ for i=1, . . . , I where $d_i$ is the vector consisting of the diagonal element of the matrix Di, i.e.:

$$d_i = \begin{bmatrix} d_i(0) \\ d_i(1) \\ \vdots \\ d_i(N-1) \end{bmatrix}$$

In a conventional MIMO-OFDM system, channel estimation relies on the transmission of pilot symbols (i.e., OFDM symbols known a priori to the receiver) and the actual estimation can occur either in the time domain (estimating $g_{ij}$) or, more frequently, in the frequency domain (estimating $h_{ij}$ through interpolation).

For the perceived application with J>>I, the present invention performs direct channel estimation and symbol detection without the transmission of any pilot symbols. To establish that this is feasible, the following equations for the frequency domain observations are applicable for a noiseless case:

$$y_1 = \sum_{i=1}^{I} D_i W_L g_{i1}$$

$$y_2 = \sum_{i=1}^{I} D_i W_L g_{i2}$$

$$\vdots$$

$$y_J = \sum_{i=1}^{I} D_i W_L g_{iJ}$$

Recognizing that there are a total of JN equations (each $y_j$ is an N×1 vector) yet the number of unknown variables is IN+IJL. Thus if J>>I and N>>L (since N>>P≥L), then it is possible that JN>IN+IJL, i.e., there are more equations than unknown variables. As such, it is feasible to solve this nonlinear system of equations for both the symbols di(k), i=1, . . . , I and k=0, . . . , N−1, as well as the channel vectors gij, i=1; . . . , I and j=1, . . . , J. As a simple example, suppose there are I=2 transmit antennas, J=16 receive antennas, a total N=1024 subcarriers with a CP length P=64 (which is an upper bound on the channel length L). For this example, there are a total of JN=16384 equations with the number of variables being upper bounded by IN+IJP=4096. Thus, there are far more equations than variables. In the present invention, the structure of the noisy signal model is exploited to help solve for the unknown variables in real time, thus making it practical to implement the proposed scheme in a real communication system.

Given the assumption that noises are AWGN both spatially (across antennas) and in frequency (for different carriers), the natural objective function arising from the signal model becomes the following minimization problem:

$$\min_{\substack{d_i, g_{ij} \\ i=1,\ldots,I, \\ j=0,\ldots,N-1}} \sum_{j=1}^{J} \left\| y_j - \sum_{i=1}^{I} D_i W_L g_{ij} \right\|^2. \quad (4)$$

If the symbols are known a priori (i.e., they are pilot symbols), then by defining $$D = [D_1 W_L \mid D_2 W_L \mid \ldots \mid D_I W_L] \quad (5)$$

and $$g_j = \begin{bmatrix} g_{1j} \\ g_{2j} \\ \vdots \\ g_{Ij} \end{bmatrix}$$

for j=1; _ _ _; J, then we can decouple the channel estimation problem for each receive antenna j into the following simple least square problem:

$$\min_{g_j} \| y_j - D g_j \|^2. \quad (6)$$

which can be solved fairly efficiently.

If the channels are known (e.g., having been estimated), both $g_{ij}$ and $h_{ij} = W_L g_{ij}$ can be reconstructed. In this case, for the kth subcarrier, the received signals are stacked across all receive antennas, i.e., defined as follows:

$$y^{(k)} = \begin{bmatrix} y_1(k) \\ y_2(k) \\ \vdots \\ y_J(k) \end{bmatrix} \quad (7)$$

for k=0, . . . , N−1. It is clear that, from equation (3), $$y^{(k)} = \begin{bmatrix} \sum_{i=1}^{I} h_{i1}(k)d_i(k) + z_1(k) \\ \sum_{i=1}^{I} h_{i2}(k)d_i(k) + z_2(k) \\ \vdots \\ \sum_{i=1}^{I} h_{iJ}(k)d_i(k) + z_J(k) \end{bmatrix} = H^{(k)}d^{(k)} + z^{(k)}$$

where $$H^{(k)} = \begin{bmatrix} h_{11}(k) & h_{21}(k) & \cdots & h_{I1}(k) \\ h_{12}(k) & h_{22}(k) & \cdots & h_{I2}(k) \\ \vdots & \vdots & \ddots & \vdots \\ h_{1J}(k) & h_{2J}(k) & \cdots & h_{IJ}(k) \end{bmatrix}, \quad (8)$$

$$d^{(k)} = \begin{bmatrix} d_1(k) \\ d_2(k) \\ \vdots \\ d_I(k) \end{bmatrix}, \quad z^{(k)} = \begin{bmatrix} z_1(k) \\ z_2(k) \\ \vdots \\ z_J(k) \end{bmatrix}.$$

Again, the problem of detecting the symbols reduces to a decoupled least square (LS) problem for each sub carrier:

$$\min_{d^{(k)}} \|y^{(k)} - H^{(k)}d^{(k)}\|^2 \quad (9)$$

which again can be solved fairly efficiently.

While the channel estimation and symbol detection are both ordinary LS problems, the exceedingly high dimension of the problem and the need for on-line processing that keeps up with the transmission rate suggest that more efficient receiver design is preferred.

Given the above, a natural approach that is spectrum efficient is to forgo the transmission of pilot symbols. Instead, channel estimation and symbol detection are carried out by solving the minimization problem defined in (4). However, the problem is of extremely high dimension. Besides, even if one relaxes the finite alphabet property of the digital symbols $d_i(k)$'s, the problem is in general non-convex (a fourth order polynomial) that is computationally challenging to solve directly.

Notice that given either the channel vectors $g_{ij}$'s or the transmission data $D_i$'s, the minimization problems reduce to a simple least square problem (provided the finite alphabet property is relaxed). While directly implementing an alternate descent method is not guaranteed to converge due to the non-convexity of the objective function, the observation does provide a way to design the system in a more bandwidth efficient manner that is also computationally feasible.

A simple MIMO-OFDM system may thus be designed according to the present invention to minimize the transmission of pilot symbols while ensuring that real-time channel tracking and symbol detection can be achieved. The applications of the present invention include: broadband wireless communications including both 4G that are currently being deployed as well as the 5G that are currently under intense research and development, such as for uplink transmission where a mobile station (e.g., a hand held device) is communicating to a base station (cell tower); satellite to ground communications where a large antenna array is deployed at the ground receiver; air to ground communications where the transmitter is hosted on airborne platforms while the receiver is a ground array that employs a large amount of antennas, including both military applications with either airplane or unmanned aircraft as the transmitter or the emerging application with commercially available drones as the transmitter so that high quality video streaming is enabled from the airborne platforms to the ground array; and other wide band multi-carrier wireless communications where the receiver is equipped with a large number of antennas while the transmitter has only a limited number of antennas.

What is claimed is:

1. A wireless communication system, comprising:
a transmitter having multiple transmit antennas programmed to transmit independent data streams using a plurality of sub-carriers, wherein each data stream includes a data frame having a single training orthogonal frequency division multiplexing (OFDM) block and a plurality of payload OFDM blocks; and
a receiver having multiple receive antennas programmed to receive the independent data streams, to perform a channel estimation in the time domain using the single training OFDM block, and to use the channel estimation to detect the next payload OFDM block in the plurality of payload OFDM blocks;
wherein the receiver is programmed to perform the channel estimation using asymptotic orthogonality of a data symbol matrix based on the number of sub-carriers.

2. The system of claim 1, wherein the receiver is programmed to perform the channel estimation by aggregating the single training OFDM blocks from all transmit antennas and all sub-carriers.

3. The system of claim 2, wherein the receiver is programmed to perform the channel estimation by constructing a matrix using the aggregated single training OFDM blocks.

4. The system of claim 3, wherein the single training OFDM blocks are previously detected payload OFDM blocks.

5. The system of claim 4, wherein the receiver is programmed to detect the single training OFDM block or the payload OFDM block using data received at a predetermined sub-carrier from all receive antennas, constructing a frequency response vector, to construct a multiple-input multiple-output (MIMO) matrix corresponding to the predetermined sub-carrier for all vectors, to calculate the least square estimate in lieu of matrix inversion, and to map the least square estimate to a constellation set using minimum distance criteria.

6. The system of claim 5, wherein the receiver is programmed to perform a down-conversion and sample the independent data streams.

7. The system of claim 6, wherein the receiver is programmed to convert the sampled and down-converted independent data streams into frequency domain signals.

8. The system of claim 7, wherein the receiver is programmed to process the converted frequency domain signals together for channel estimation.

9. The system of claim 8, wherein only a single training OFDM block is used.

10. A method of communicating data in a multiple-input multiple-output orthogonal frequency division multiplexing wireless communication system, comprising:

transmitting independent data streams using a plurality of sub-carriers from a transmitter having multiple transmit antennas, wherein each data stream includes a data frame having a single training orthogonal frequency division multiplexing (OFDM) block and a plurality of payload OFDM blocks; and receiving the independent data streams with a receiver having multiple receive antennas programmed to receive;

performing a channel estimation in the time domain using the single training OFDM block, wherein the step of performing the channel estimation comprises using asymptotic orthogonality of a data symbol matrix based on the number of sub-carriers; and using the channel estimation to detect the next payload OFDM block in the plurality of payload OFDM blocks.

11. The method of claim 10, wherein the step of performing the channel estimation comprises aggregating the single training OFDM blocks from all transmit antennas and all sub-carriers.

12. The method of claim 11, wherein the step of performing the channel estimation further comprises constructing a matrix using the aggregated single training OFDM blocks.

13. The method of claim 12, wherein the single training OFDM blocks are previously detected payload OFDM blocks.

14. The method of claim 13, further comprising the steps of:

detecting the single training OFDM block or the payload OFDM block using data received at a predetermined sub-carrier from all receive antennas;

constructing a frequency response vector, constructing a multiple-input multiple-output (MIMO) matrix corresponding to the predetermined sub-carrier for all vectors;

calculating the least square estimate in lieu of matrix inversion; and mapping the least square estimate to a constellation set using minimum distance criteria.

15. The method of claim 14, wherein the step of receiving the independent data streams comprises performing a down-conversion and sampling of the independent data streams.

16. The method of claim 15, wherein the step of receiving the independent data streams further comprises converting the sampled and down-converted independent data streams into frequency domain signals.

17. The method of claim 16, wherein the step of receiving the independent data streams further comprises processing the converted frequency domain signals together for channel estimation.

\* \* \* \* \*